United States Patent [19]
Snead

[11] 3,843,263
[45] Oct. 22, 1974

[54] HELICOPTER OTPICAL POSITION INDICATOR
[75] Inventor: Edwin E. Snead, Yeadon, Pa.
[73] Assignee: Burroughs, Detroit, Mich.
[22] Filed: Aug. 31, 1973
[21] Appl. No.: 393,650

[52] U.S. Cl................ 356/153, 340/26, 244/144 R, 114/43.5
[51] Int. Cl. ........................................... G01b 11/26
[58] Field of Search......... 356/153, 154; 244/114 R; 114/43.5; 340/26

[56] References Cited
UNITED STATES PATENTS
3,233,216  2/1966  Ogle et al. ............................ 340/26
3,729,262  4/1973  Snead et al. ......................... 356/153

Primary Examiner—Ronald L. Wibert
Assistant Examiner—Paul K. Godwin
Attorney, Agent, or Firm—Francis A. Varallo; Edward J. Feeney, Jr.; Edward G. Fiorito

[57] ABSTRACT

A system is described which provides a visual display for the accurate landing of helicopters and VTOL (Vertical Take Off and Landing) aircraft on areas of restricted size, including landing pads on non-aviation type ships. The system employs a combination of lenses and light sources arranged to create for the pilot, information for aligning the aircraft center line relative to the landing pad, locating the aircraft at the exact hover point above the touchdown point and continuously indicating the aircraft height above the landing pad during the descent and touchdown.

11 Claims, 12 Drawing Figures

AIRCRAFT TO THE RIGHT OF
LANDING PAD CENTER LINE

AIRCRAFT TO THE RIGHT OF
LANDING PAD CENTER LINE

ON CENTERLINE AND
AT HOVER INDICATOR
"PICK-UP" POINT

ON CENTERLINE AND
PROCEEDING TOWARD
HOVER POINT

AT HOVER POINT AND
AT HOVER HEIGHT

DESCENDING TO TOUCHDOWN
AND ON CENTERLINE

TOUCHDOWN AND
ON TARGET

PATENTED OCT 22 1974　　3,843,263

84 - VIRTUAL IMAGE FOR HOVER MODULE
76 - VIRTUAL IMAGE FOR CENTER LINE MODULE
86 - HOVER POINT
80 - "PICK-UP" POINT

3,843,263

HELICOPTER OPTICAL POSITION INDICATOR

CROSS REFERENCES TO RELATED APPLICATIONS

The helicopter landing system of the present invention is related to the optical display device described and claimed in application Ser. No. 674,228 which issued as U.S. Pat. No. 2,991,743. "Optical Device for Image Display," by James A. Ogle, and to application Ser. No. 164,350 which issued as U.S. Pat. No. 3,729,262, "Optical Lens Docking System," by Edwin E. Snead and Jay B. Pitkow. These patents are assigned to the same assignee as the present application.

BACKGROUND OF THE INVENTION

In the reference Ogle patent an optical device is described for displaying the image of reference objects to an observer. More specifically, the device is employed as an optical glide path indicator for visually indicating to a pilot the proper glide angle for the safe landing of an aircraft on an area of restricted size. Such an area might be the flight deck of an aircraft carrier.

In connection with the optical system of the reference Ogle patent, an assembly is provided comprising a plurality of cells, each cell having reference lamps and lenses so disposed with respect to one another that an image of the reference lamps is produced. In terms of aircraft landing, the image of the lamps seen by the pilot is a horizontal bar of light which appears to move up or down depending upon the aircraft's angle of approach. Associated with the assembly but external thereto are fixed rows of lights which establish a datum line. The correct glide angle is indicated by the visual alignment of the bar of light with the datum line. Having made the necessary adjustments in his angle of descent, the pilot is required only to achieve the proper touch-down point for a safe landing.

In accordance with the reference Snead et al patent, an optical display device is provided which utilizes Fresnel lenses and ribbed lenticulars positioned with respect to light sources to create information for accurately docking or parking aircraft and other vehicles. Such information provides accurate center line steering, closing rate indication and a repeatable stopping point.

Neither of the reference patents are directed to the problems involved in the landing of helicopters and vertical descent aircraft on areas of restricted size, particularly on landing pads of non-aviation type ships. The Ogle patent is concerned with the establishment of a glide slope angle such as would be required for the landing of fixed wing aircraft on the deck of an aircraft carrier and the Snead et al, patent involves docking procedures after the aircraft has landed. It is essential for safe operation in the landing of helicopters, particularly on the above mentioned shipboard pads, that the pilot have precise information regarding relative ship and aircraft positions for close maneuvering. This information is needed under all environmental conditions such as day and night operation, in snow or rain, bright sunlight and fog. Moreover, additional criticality is involved when the sea state is rough and turbulent. The present invention provides such information and functions equally well under all of the above mentioned conditions.

SUMMARY OF THE INVENTION

In accordance with the present invention there is provided a display device using a plurality of lenses and light sources and capable of concurrently displaying interrelated information required by the helicopter pilot for the landing of the aircraft at a precise point on an area of limited size. The display comprises three modules which present respectively visual information for center line alignment, hover point alignment and descent position indication. In effect these pieces of information are blended by the display device into a unitary presentation of all the data required by the helicopter pilot for a safe, precise landing.

In operation, the pilot orients his aircraft to secure consecutive alignment of the apparent moving bars of light within the modules, with their respective datum markers. Center line, hover, and descent alignment indications are established in turn, while the alignment of each of these indicators is maintained as the succeeding alignment is accomplished. At the touchdown point, all three indicators are in alignment with their datum markers as seen by the pilot.

Other features of the invention will become more fully apparent in the detailed description of the display device and its mode of operation which follow.

DESCRIPTION OF THE PREFERRED EMBODIMENT

FIGS. 1a–1f inclusive, depict the acquisition sequence of the helicopter position indicator alignment, as viewed by the pilot of the landing aircraft 10.

In the case of a landing pad 12 aboard a non-aviation type ship, the display device 14 will be positioned on the hangar deck in such a manner that the center line alignment module 16 will be to the right of the landing pad center line but directly in front of the pilot. The module distance to the right is chosen to coincide with the distance the pilot is displaced to the right of the center line of the aircraft.

Figure 1A:
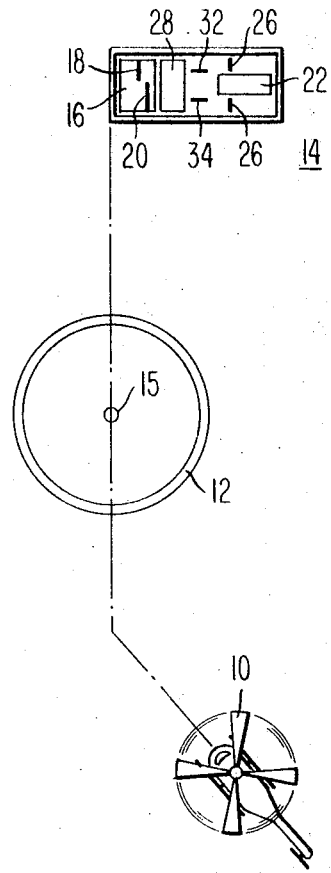
FIGS. 1a–1f inclusive, illustrate the sequence of events in landing a helicopter utilizing the present invention.
Figure 1B:
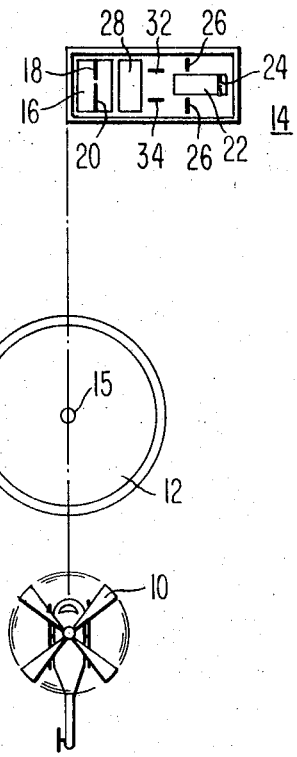

When the helicopter is approximately 200 feet from the hover point 15, which lies directly above the center of the landing pad 12, the pilot will utilize the helicopter center line alignment module 16. The pilot observes two vertical bars of light 18 and 20 in the module, as seen in FIG. 1a. The upper bar of light 18 will appear to remain stationary, while the lower vertical bar 20 will appear to move to the right or the left, depending upon the point from which it is viewed as the helicopter 10 approaches the landing area 12. In FIG. 1a the pilot is within the viewing angle of the center line module display but the center line of the approaching helicopter is to the right of the landing pad center line. This condition is reflected in the center line module display wherein the light bar 20 is to the right of the datum marker 18. The pilot then maneuvers the helicopter to align the lower vertical bar 20 with the upper vertical bar of light 18. This alignment is illustrated in FIG. 1b. The helicopter center line is then coincident with the landing pad center line, and the pilot maintains the display alignment which appears as a continuous vertical bar of light, as he approaches the landing area.

Figure 1C:
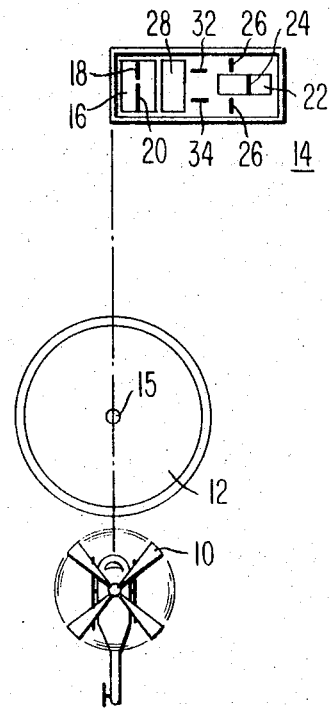
Figure 1D:
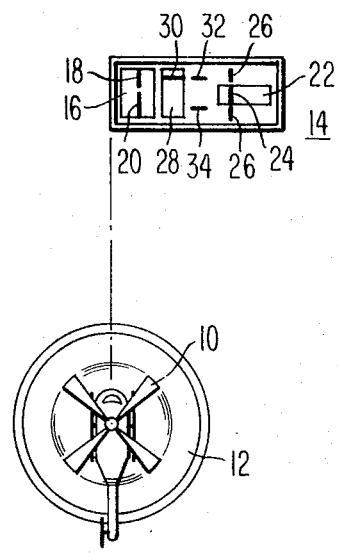
Figure 6:
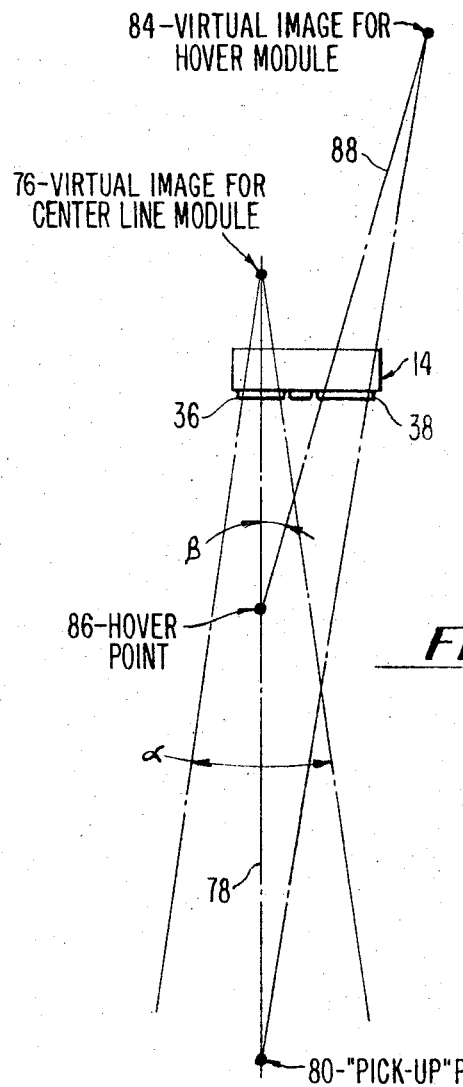
FIG. 6 is an optical schematic depicting the angular relationship between the eye of the observer and the images formed respectively by the center line and hover modules.

The pilot next observes the hover point module 22 display. When he is approximately 75 feet from the hover position (that is, at the hover indicator "pick-up" point) a vertical bar of light 24 (approximately half the length of the center line module light bar 20) will become visible to the pilot and will appear to move to the left as the helicopter approaches the hover point 15. The apparent position of this bar of light is illustrated in FIG. 1c for a distance of approximately 35 feet from the hover point 15. When the moving vertical bar of light 24 in the hover module is aligned with the hover position datum arms 26 as seen in FIG. 1d, the pilot ceases his approach. The vertex of the angle defined by the pilot's respective lines of sight to the aligned center line and hover point light bars, 20 and 24 respectively, have placed the aircraft at the exact point 15 above the helicopter landing spot. The optical schematic of FIG. 6 illustrates this condition and will be considered in detail hereinafter.

Figure 1E:
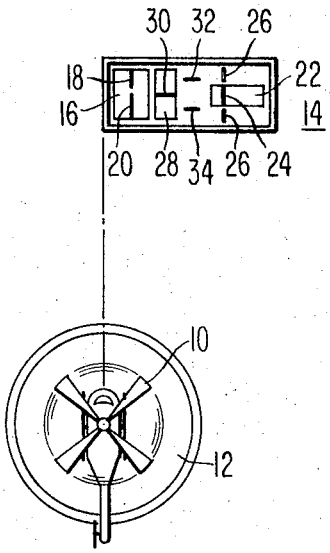
Figure 1F:
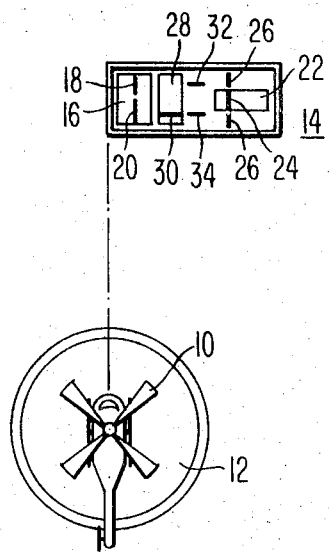

The pilot maintains the center line and hover point alignments while next observing the descent module 28 display. This module which is positioned between the other modules, provides a horizontal bar of light 30 which corresponds to the wheels or landing carriage of the aircraft and which appears to move between upper and lower hover position datum arms 32 and 34 as the pilot makes his descent. Alignment of the horizontal bar 30 with the upper datum arm 32 indicates that the aircraft is at the proper hover altitude prior to its descent. The altitude varies with the particular installation, but may be of the order of thirty-five feet. This condition is shown in FIG. 1d. As the pilot lowers the helicopter toward the touchdown spot, he will see the bar of light move downward, as illustrated in FIG. 1e. At this point he may be only about five feet above the landing area. In the case of shipboard landings, while the helicopter is descending, the pilot will visually note any change in sea state by the apparent movement of the lower deck touchdown datum arm 34 relative to the light bar 30 in the descent module 28. He can then synchronize touchdown with the ship's changing altitudes. When the pilot lands on target, the height indicating light bar 30 will be in direct coincidence with the deck touchdown datum bar 34, as seen in FIG. 1f. All three modules will indicate alignment conditions at this time.

Figure 2:
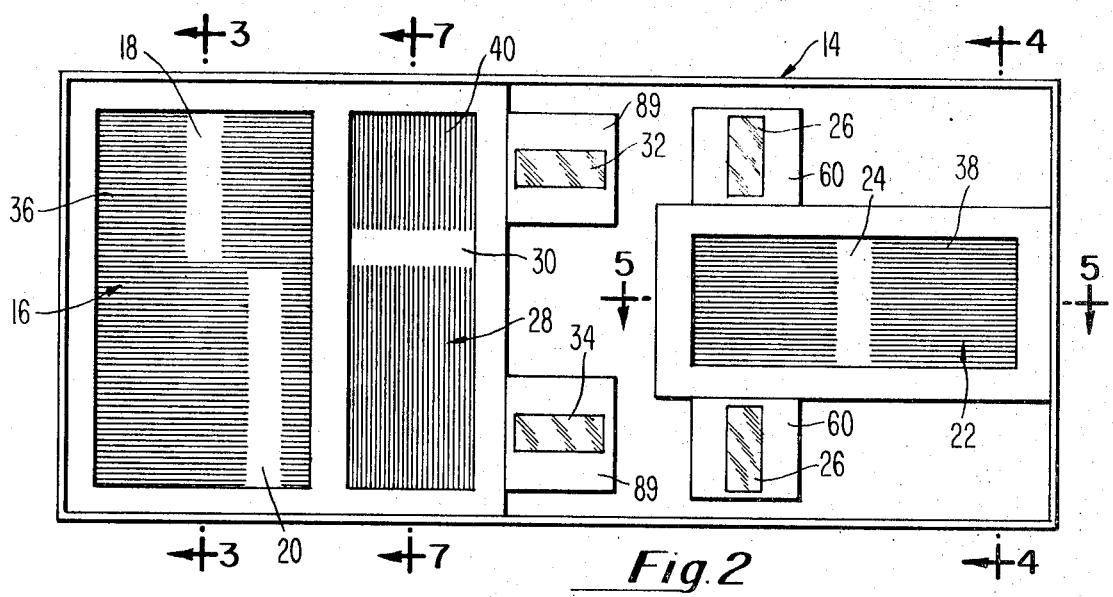
FIG. 2 is a front view of the display device as seen by the observer.

FIG. 2 is a pictorial representation of the helicopter optical position indicator 14 illustrating the center line alignment module 16, the hover point module 22 and the descent module 28. Two back-lighted hover point alignment arms 26 which are adjustable in the horizontal direction are associated with the hover point module. Similarly the descent module 28 includes two back-lighted datum arms, a hover position datum arm 32 and a deck touchdown datum arm 34, each of which may be independently adjusted in a vertical direction.

The external surfaces of the center line module 16 and the hover point module 22 are made up of horizontal ribbed lenticulars, designated respectively 36 and 38, and the descent module, of vertical ribbed lenticulars 40.

Figure 3:
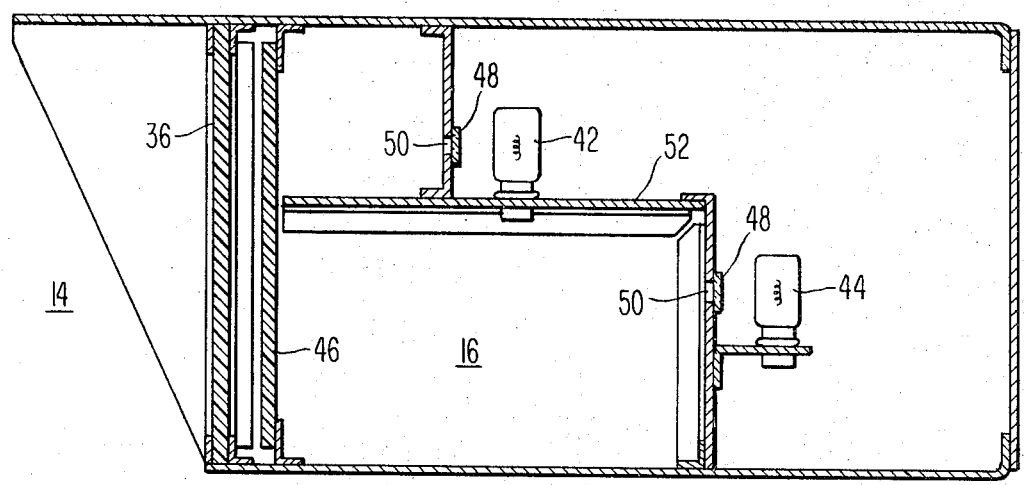
FIG. 3 is a section view of the center line module of the display taken along line 3—3 of FIG. 2.
Figure 4:
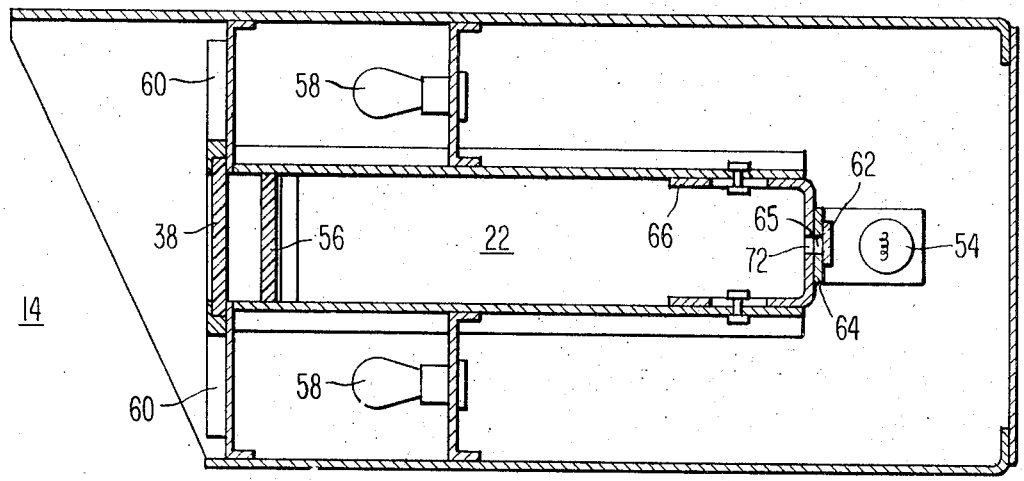
FIG. 4 is a section view of the hover module of the display taken along line 4—4 of FIG. 2.
Figure 5:
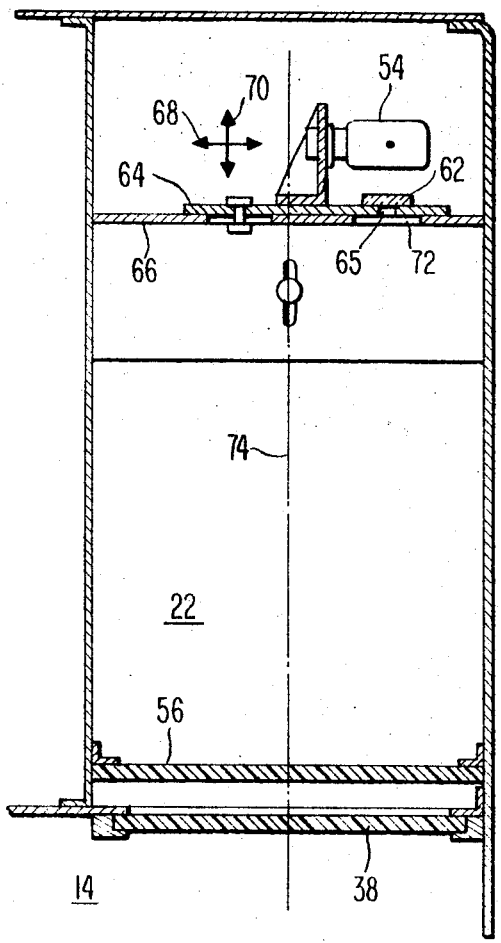
FIG. 5 is a section view of the hover module of the display taken along line 5—5 of FIG. 2.

FIGS. 3, 4, 5 and 7 are section views of the unit taken respectively along lines 3—3, 4—4, 5—5, and 7—7 in FIG. 2. Thus FIG. 3 is a view taken through the center line alignment module 16; FIGS. 4 and 5, through the hover point module 22; and FIG. 7, through the descent indicator module 28. Like reference characters have been used throughout the drawing to identify like components.

With continued reference to FIG. 2 and specific reference to FIG. 3, there are shown two projection type lamps 42 and 44 which serve as light sources, and a lens system comprising a Fresnel lens 46 and cylindrically ribbed lenticulars 36. It should be understood that other combinations of lenses, the character of which are well-known to the optical designer, may also be satisfactorily employed. Therefore, although the present invention is not to be considered limited to the use of a Fresnel lens and lenticular spreaders as described herein, such a combination has proved highly successful.

The lamp 42 provides the datum line 18; lamp 44, the center line bar 20. The filaments of the lamps 42 and 44 are vertical, that is, parallel with the longitudinal axes of their emvelopes. The ground glass pieces 48 are illuminated by the lamps 42 and 44 and serve as the objectives for the lens system. The slots 50 permit the Fresnel lens 46 to image the light on the ground glass pieces at a predetermined distance behind the lens. The light baffle 52 within the module 16 segregates the images of the lamp filaments.

The ground glass pieces 48 have a diffused surface facing the Fresnel lens and a polished surface on the side adjacent the light source. The glass is of a type which will withstand the high temperatures of the projection lamps and has a spectral color of 5,500 Angstroms, a high visibility color, sometimes referred to as "aviation yellow." Thus the light bars generated within the module are of this easily discernible yellow color. The slots 50 serve to diminish the scattering of light within the module.

It is apparent from FIG. 3 that the datum lamp 42 is positioned much closer to the Fresnel lens 46 than lamp 44. The sensitivity of the display as experienced by the observer varies directly with a change in the distance behind the lens at which the visual image of the light source appears. Thus, the sensitivity of the datum line display is by the aforementioned positioning so diminished, that the observer is unaware of any horizontal movement of the datum line 18 as he moves to align the lower bar 20 therewith. The sensitivity of the lower moving bar 20 is chosen to be adequate for particular applications. Increasing the distance of lamp 44 from the Fresnel lens 46 increases the sensitivity of the display, that is, the rate of apparent movement of the light bar 20. At the same time, however, the increase in sensitivity is accomplished by a decrease in the horizontal audience angle through which the display is visible. An audience angle of 8° on either side of the landing pad center line is suitable for most applications. This angle correlates to approximately seven feet per hundred. At a distance of about 120 feet from the display, the pilot will observe the lower vertical light bar if he is not off course more than seven feet, that is, within seven feet of the landing pad center line.

The lenticular spreaders 36 as employed in the center line module 16 and positioned in front of the Fresnel lens 46, are made up of clear, colorless cylindrically ribbed pieces in which the axes of the ribs are mounted horizontally. The action of the cylindrically ribbed lenticular is well-known in the art and can most simply be considered as that of a sequence of prism angles with sufficiently frequent repetition so that they appear to an observer to be continuously adjacent. This sequence of prism angles causes a vertical spreading of the rays emerging from the Fresnel lens 46 and allows the vertical images of lamps 42 and 44 to lose discrimination in the vertical plane. The lenticular spreaders also scatter reflected light such as that resulting from the sun's rays, thereby reducing the apparent intensity of the reflection to a tolerable level.

FIGS. 4 and 5 are section views providing more details of the hover point module 22. Considering FIG. 4 certain of the components are similar to those of the center line module 16. A projection type lamp 54 serves as a light source. Its longitudinal axis is mounted on a horizontal plane, although its filament is vertical, that is, at right angles to the axis. The lens system comprises a Fresnel lens 56 and a cylindrically ribbed lenticular 38, the axes of the ribs being mounted horizontally. The hover point alignment data markers 26 are backlighted respectively by a pair of floodlights 58. In practice the datum marker assemblies may comprise opaque sectional pieces 60 fastened to the front of the display 14 and having translucent windows which define the light bars 26.

As seen more clearly in FIG. 5, the lamp 54 and ground glass objective 62 are supported by a bracket 64 which includes a narrow rectangular slot 65 adjacent the ground glass. The bracket 64 is turn is mounted on a U-shaped member 66. The bracket 64 and U-shaped member 66 are designed to be independently moveable in respective orthogonal axes lying on a horizontal plane. Thus, bracket 64 is moveable in the direction of the arrows 68; and U-shaped member 66, in the direction of the arrows 70. The portion of the latter member adjacent the moveable bracket 64, contains an elongated slot 72, to allow for light passage to the Fresnel lens 56 regardless of the position of lamp 54 with respect to the Fresnel lens optical axis 74. By this means, the vertical image distance and location as seen by the observer may be varied to accommodate a change in the intersecting point or hover point for individual landing areas. In the preparation for the operation of the device, the lamp 54 is moved with respect to the optical axis 74 of the Fresnel lens 56 (while keeping the horizontal distance from the lens constant). The observer is positioned at the intersecting point of the center line alignment module 16 and the hover point 15 and the location of the light source 54 is adjusted within the hover point module 22. Thus, lamp 54 is positioned a specific distance off the optical axis of the Fresnel lens and a predetermined distance from the lens such that when the image of the lamp is viewed by the observer at the prescribed hover point distance from the display, the vertical bar of light 24 created in the hover module 22 will be aligned alongside the datum markers 26.

It should also be noted that varying the horizontal distance of light source 54 from the Fresnel lens 56 will change the sensitivity of the display. Increasing the sensitivity, allows the observer to view a faster moving hover bar 24 and allows for more accurate alignment of the bar with the datum arms 26. On the other hand, the horizontal audience through which the display is visible decreases with increasing sensitivities. A satisfactory arrangement has been found to be a light source to Fresnel lens distance which produces a virtual image approximately fifteen feet to the rear of the Fresnel lens. The minimum pick-up point where the pilot will first observe the hover point vertical bar is 65 to 75 feet before reaching the hover point 15.

The angular relationships which exist between the observer and the vertical images produced in the center line module 16 and hover module 22 are clearly shown in the optical schematic of FIG. 6. As the observer approaches the display 14, he is able to view the moving vertical bar of the center line module throughout the illustrated viewing angle $\alpha$. The virtual image of light source 44 for the center line module 16 appears at point 76. The pilot, having aligned the center line of his aircraft with the center line of the landing pad 12 by adjusting his line of sight to coincide with line 78, proceeds toward the display 14. At "pick-up" point 80, he first observes the light bar 24 from the hover module 22. The virtual image of the hover light source 54 appears at point 84. As he proceeds further toward the display, he arrives at the hover point 86 as indicated by the alignment of the vertical light bar 24 in the hover module with the hover point datum arms 26. The hover point 86 is the vertex of the angle $\beta$, the sides of which are the respective lines of sight, 78 and 88 to the center line and hover modules, under alignment conditions. Obviously, as indicated herebefore, the actual desired hover point, may be changed, by adjustment of the light source 54 with respect to the Fresnel lens 56 in the hover module thereby changing either or both the distance of the virtual image from the Fresnel lens and its location with respect to the optical axis 74 of the lens.

Figure 7:
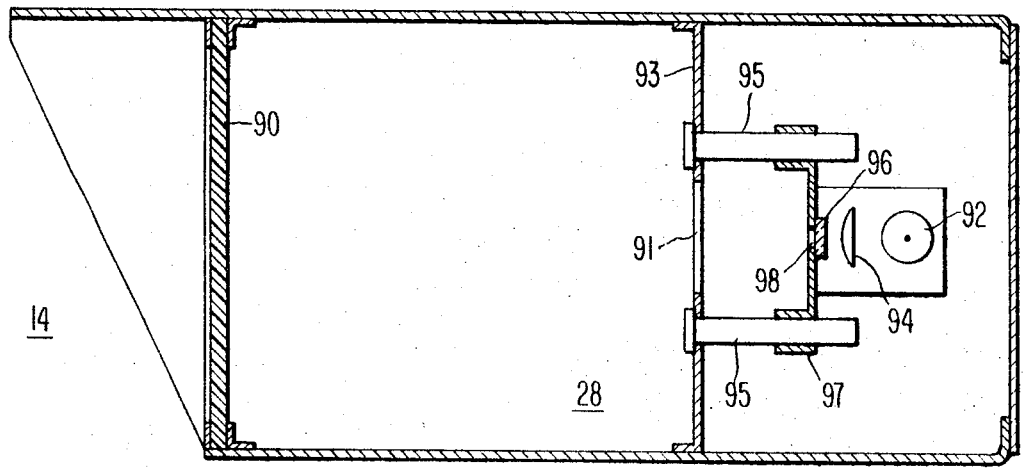
FIG. 7 is a section view of the descent module of the display taken along line 7—7 of FIG. 2.

FIG. 7 is a section view of the descent indicator module 28. This module differs somewhat from the previously described modules in its optical configuration. The Fresnel lenses utilized in the center line and hover modules are not employed in the descent module. Instead, only a ribbed lenticular 90, having its ribs oriented in a vertical direction is used. The light source 92 for the module is positioned in such a manner that an angle included between the helicopter hover point and the landing pad, relative to the pilot eye height, is formed. This angle is commonly in excess of 30°.

The descent module 28 uses an optical condensing system in which the light source 92 is a tungsten-halogen lamp for providing an intensity of illumination similar to that present in the other modules. An aspheric lens 94 of plano-convex configuration and having the required short focal length to concentrate a high intensity light beam on the ground glass objective 96 and slot 98, is mounted between the light source 92 and the objective. Such an arrangement insures an adequate horizontal light bar 30. The entire aspheric lens, objective and lamp assembly is supported by a common bracket 97 which is moveable on sleeves 95 to permit horizontal adjustment with respect to lens 90, thereby changing the angle of view. The section 93 supporting the sleeves 95 has an aperture 91 of sufficient size to allow for the maximum possible viewing angle.

With general reference to FIG. 2, two horizontal datum arms identified functionally as a hover position datum arm 32 and a touchdown datum arm 34 are utilized in connection with the moving horizontal bar of light formed in the descent module 28. Although not illustrated in FIG. 7, these datum arms which comprise opaque sections 89 with rectangular translucent windows, are backlighted by floodlight sources similar to the arrangement described hereinbefore for the hover module datum arms 26 (FIG. 4). The location of the translucent windows in the opaque sections may be independently varied in a vertical direction to provide proper alignment both at the helicopter hover point and the touchdown point with the horizontal descent indicating light bar 30. On board ship, the lower datum light 34 references the deck, and is biased by the helicopter landing surface-to-pilot eye height. Alignment of the descending light bar 30 with this lower datum arm by the pilot, indicates that the helicopter wheels or landing carriage are in contact with the landing pad.

A few miscellaneous considerations are worthy of mention. The three internal modules of the display depicted in FIG. 2 are separated by vertical and horizontal light baffles to produce the desired effect from each module and to avoid undesirable interactions. A representative overall size of the indicator 14 may be of the order of 18 inches in height, 42 inches in width and 28 inches in depth. It must be emphasized that these dimensions may vary appreciably according to individual applications and are given solely for purpose of example. The housing itself is chosen to be resistant to climatic conditions, particularly those encountered in shipboard installations. Another feature, not shown in the drawing, but described in detail in the referenced Snead et al patent is that of providing a light intensity control device to maintain an optimum contrast ratio between the module displays and the surrounding ambient light. If desired, such a control may advantageously be used in the present device. Besides adjusting the light intensity in direct proportion to the ambient light conditions, the control permits operation of the light sources at voltages well below their ratings. This mode of operation insures long lamp life.

From the description of the present invention and its mode of operation, it is apparent that an accurate, highly reliable and relatively uncomplicated helicopter landing aid is provided which has general applications whereever touchdown is rendered critical because of the restricted size of the landing area. It should be understood that changes and modifications of the configuration described herein may be needed to suit particular requirements. Changes and modifications, which do not represent departures from the true scope and spirit of the invention, are intended to be covered by the claims which follow.

What is claimed is:

1. An optical device for assisting the landing of helicopters and other vertical descent aircraft by providing visual information to permit the pilot to pursue a flight path along a prescribed center line relative to the landing pad, to locate the aircraft at a precise hover point along said center line and directly above the desired touchdown point, and to continuously indicate the altitude of the aircraft above the landing pad during descent comprising:

a center line module having at least first and second light sources and a first lens system positioned with respect to said light sources to form respective images thereof, light baffle means situated within said center line module for separating the images of said light sources as seen by said pilot, said first light source being positioned a first distance from said first lens system wherein the image formed thereof as viewed by said pilot appears to remain stationary and serves as a vertical datum bar, said second light source being positioned at a second distance from said first lens system whereby the image formed thereof serves as a vertical center line bar, said vertical center line bar when viewed by said pilot appearing to move horizontally with respect to said vertical datum bar in response to movement in a horizontal plane on either side of said center line by said pilot, the alignment of said center line bar with said datum bar by said pilot being indicative of flight along said prescribed center line, a hover module having at least a single light source and a second lens system positioned with respect thereto such that the image formed by said second lens system as seen by said pilot serves as a vertical hover bar, hover point alignment datum arms positioned in predetermined relationship to said hover module, said hover bar appearing to said pilot to move in a horizontal direction in response to changes in the distance of said aircraft from said hover point, the concurrent alignments by said pilot of said center line bar with said datum bar and said hover bar with said hover point alignment datum arms being indicative of the aircraft having reached said hover point.

a descent module having at least a single light source and a third lens system positioned with respect thereto such that the image formed by said third lens system as seen by said pilot serves as a horizontal descent bar, a hover position datum arm and a touchdown datum arm positioned at substantially opposite extremities of said descent module, alignment by said pilot of said horizontal descent bar with said hover position datum arm indicating a predetermined hover point altitude prior to descent, said descent bar appearing to move in a vertical direction toward said touchdown datum arm during descent, the alignment of said descent bar with said touchdown datum arm, together with said concurrent alignments of said center line and hover bars with their respective datum markers indicating the presence of said aircraft at said touchdown point.

2. An optical device as defined in claim 1 wherein said first lens system comprises a first lens so positioned with respect to said center line module first and second light sources that virtual images of said sources are formed, and a second lens positioned with respect to said first lens for diffusing the rays of light emerging from said first lens.

3. An optical device as defined in claim 2 wherein said first lens is a Fresnel lens and said second lens is a cylindrically ribbed lenticular having its rib axes oriented horizontally to effect the vertical spreading of the light rays emerging from said Fresnel lens.

4. An optical device as defined in claim 3 further characterized in that said first lens system comprises ground glass pieces illuminated respectively by said center line module first and second light sources and serving as objectives for said first lens system.

5. An optical device as defined in claim 1 wherein said second lens system comprises a first lens so positioned with respect to said hover module light source that a virtual image of said source is formed, and a second lens positioned with respect to said first lens for diffusing the rays of light emerging from said first lens.

6. An optical device as defined in claim 5 wherein said first lens is a Fresnel lens and said second lens is a cylindrically ribbed lenticular having its rib axes oriented horizontally to effect the vertical spreading of the light rays emerging from said Fresnel lens.

7. An optical device as defined in claim 6 further characterized in that said second lens system comprises a ground glass piece illuminated by said hover module light source and serving as the objective for said second lens system.

8. An optical device as defined in claim 7 wherein said hover module light source is positioned a predetermined horizontal distance off the optical axis of said Fresnel lens and a predetermined horizontal distance therefrom such that when the hover bar is viewed from said hover point, it will be aligned with said hover point alignment datum arms.

9. An optical device as defined in claim 8 further including means for moving said hover module light source in two orthogonal axes lying in a horizontal plane to independently adjust the respective distances of the light source from the Fresnel lens optical axis and the Fresnel lens itself.

10. An optical device as defined in claim 1 wherein said third lens system comprises an optical condensing system including a ground glass objective and an aspheric lens interposed between said descent module light source and said objective, said third lens system further comprising a cylindrically ribbed lenticular having its rib axes oriented vertically to effect the horizontal spreading of the light rays emerging from said optical condensing system.

11. An optical device as defined in claim 10 further including means for adjusting the horizontal distance between said condensing system ground glass objective and said cylindrically ribbed lenticular to change the vertical angle through which the descent bar is visible to said pilot.

* * * * *